Aug. 6, 1968  M. A. KOTT  3,396,397
DIELECTRIC ZOOM LENS FOR MICROWAVE BEAM SCANNING
Filed Oct. 20, 1965  6 Sheets-Sheet 1

INVENTOR.
MICHAEL A. KOTT
BY Harry A. Herbert Jr
ATTORNEY
Eugene J. Pawlikowski
AGENT

United States Patent Office 3,396,397
Patented Aug. 6, 1968

3,396,397
DIELECTRIC ZOOM LENS FOR MICROWAVE BEAM SCANNING
Michael A. Kott, Baltimore, Md., assignor to the United States of America as represented by the Secretary of the Air Force
Filed Oct. 20, 1965, Ser. No. 499,123
2 Claims. (Cl. 343—754)

ABSTRACT OF THE DISCLOSURE

A pair of relatively movable negative dielectric lenses are positioned between two stationary positive dielectric lenses with all of the lenses being located on a common optical axis. Microwave energy is directed toward the lens system by a small feed horn.

---

This invention relates to a variable beamwidth antenna and, particularly, to an antenna which consists of an axial lens system that permits continuous variation of the radiation pattern characteristics in the microwave region of the spectrum.

An object of this invention is to provide a variable beamwidth antenna in which the range of beam sharpening and widening is capable of smooth and accurate variation.

Another object of the invention is to provide a variable beamwidth antenna essentially free of diffraction.

A further object of the invention is to provide a variable beamwidth antenna supporting a radio beam in the microwave region.

A complete understanding of the invention and an introduction to other objects and features not specifically mentioned may be had from the following detailed description of an embodiment thereof when read in conjunction with the appended drawings, wherein:

FIGS. 1 and 2 illustrate prior art optical zoom lens apparatus;

FIG. 3 specifies spacings of the inner lenses of an optical zoom lens with respect to each other;

Figure 1:
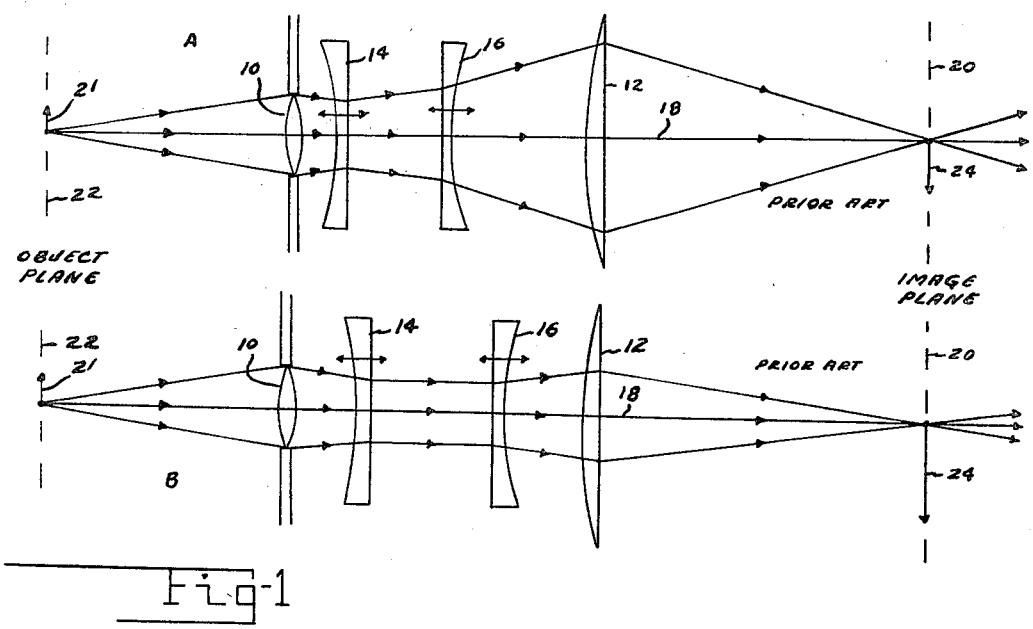

Referring now to FIG. 1, there is shown two conventional zoom lens systems generally referenced A and B, respectively. Each embodiment consists of two normally stationary outer lenses 10 and 12 and two inner axially movable lenses 14 and 16, all of which are arranged on a common optical axis 18. When moving one of the inner lenses 14 and 16 the motion of the other movable lens must be controlled in relation to that of the first-moved lens so as to maintain a fixed focus in the image plane 20 of an object 21 situated at the object plane 22. Thus, zoom lens systems of the type shown in FIG. 1 have the common feature of always permitting the image to be exactly in focus as the magnification is varied. This means that, in principle, the range of the variation in magnification can be as large as is desired, as opposed to the range limitations inherent in systems in which variable magnification is obtained by accepting a limited amount of defocusing. Symmetry of the inner lenses 14 and 16 is desirable because it permits the maximum rate of change of the effective focal length of the system with respect to the amount of lens motion. The use of concave inner lenses further helps to reduce the overall axial length of the optical system. Furthermore, it will be assumed that each of the axially aligned lenses operates with a small aperture whereby the problems in lens design are simplified.

The zoom lens system shown in FIG. 1 will be briefly considered and analyzed with the intention merely of laying a foundation for better understanding the advantages and features of the present invention.

It will be assumed, in embodiment A of FIG. 1, that the lenses 14 and 16 are positioned initially to produce, in the image plane 20, an image 24 of the object 21 placed in the object plane 22. When only one of the inner lenses is moved with no controlling movement of the other inner lens, the image is shifted from the image plane, i.e., defocused. Movement of the lens which had remained standing will effect refocusing of the system. The new positions of the inner lens, for example, might well correspond to the positions in which the lenses in embodiment B of FIG. 1 are found. As a result of complementary adjustments in the positions of lenses 14 and 16, the effective focal length of the system and hence magnification of the image will vary with no loss of sharpness of the image. It will be demonstrated hereinbelow that a continuous range of positions of lenses 14 and 16 can be found which results in a continuous range of magnifications.

Figure 2:
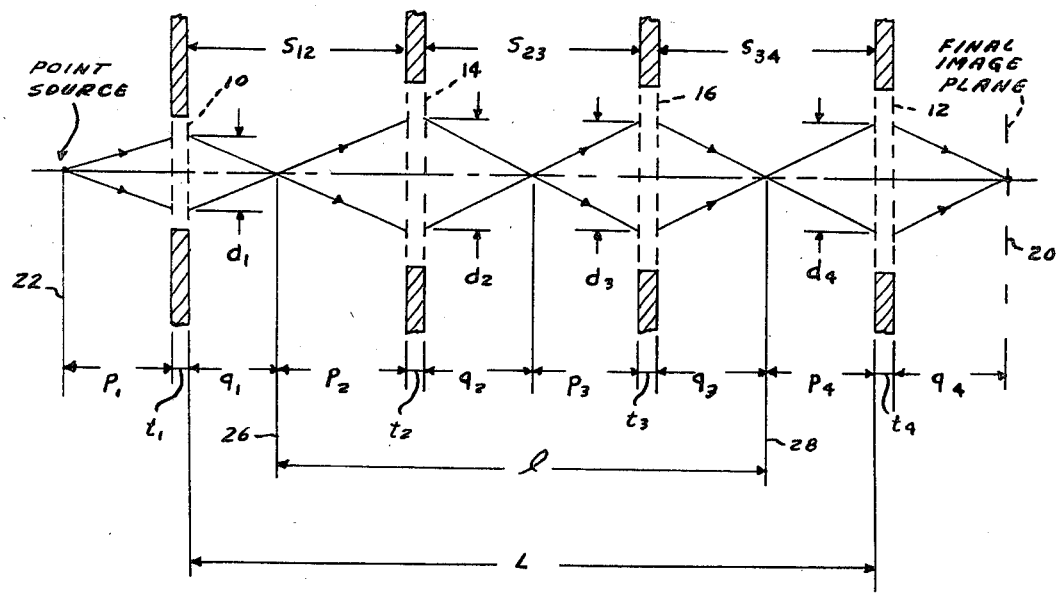

The problems of determining the positions of the inner lenses will now be considered, reference being made to FIG. 2. The solution which follows is based upon geometrical optics, and hence is subject to the restriction that all of the lens apertures be sufficiently large.

The parameters of the four lenses shown in FIG. 1 are displayed schematically in FIG. 2, and it will be assumed that the lens characteristics and dimensions, as well as the dimension of the object and image planes relative to the stationary lenses 10 and 12, respectively, are known. For the $k$th lens, let the given parameters be $p_k$=object distance relative to the principal plane
$q_k$=image distance relative to the principal plane
$f_k$=focal length
$t_k$=spacing between principal planes.

The sign conventions to be employed in FIG. 2 are: object distance is positive when measured to the left of the principal plane and negative to the right; image distances are positive when measured to the right of the principal plane and negative when measured to the left; the focal length of a converging (convex) lens is positive and for a diverging lens (concave) the focal length is negative.

As previously stated, the quantities $p_1$, L and $q_4$ in FIG. 2, as well as $f_k$ and $t_k$ for each of the lenses, are assumed to be known. By using the Gaussian lens equation $$\frac{1}{p_k}+\frac{1}{q_k}=\frac{1}{f_k} \qquad (1)$$

the quantities $q_1$ and $p_4$ and hence $$l=L-(q_1+p_4) \qquad (2)$$

are readily determined. Thus, the problem reduces to that of positioning the inner lenses so that they operate between fixed object and image planes 26 and 28 a fixed distance $l$ apart. However, with only three independent relations available, namely, $$\frac{1}{p_2}+\frac{1}{q_2}=\frac{1}{f_2} \qquad (3)$$

$$\frac{1}{p_3}+\frac{1}{q_3}=\frac{1}{f_3} \qquad (4)$$

$$p_2+q_2+p_3+q_3=l-t_2-t_3 \qquad (5)$$

it will be noted that there are four unknown quantities which are $p_2$, $q_2$, $p_3$ and $q_3$. Thus, a unique solution is not possible. It is possible however to select one parameter as an independent variable and solve for the other three in terms of it.

At this point it is convenient to define the lens spacings $S_{12}$, $S_{23}$ and $S_{34}$ as $$S_{12} = p_1 + q_2 \quad (6)$$
$$S_{23} = p_2 + q_3 \quad (7)$$
$$S_{34} = (L - t_2 - t_3) - S_{12} - S_{23} \quad (8)$$

The allowed solution can then be expressed by $$S_{12} = q_1 - A \pm \sqrt{A^2 + B} \quad (9)$$

where $$A = \frac{S_{23}^2 - S_{23}(2f_2 + 1 - t_2 - t_3) + (f_2 + f_3)(l - t_2 - t_3)}{2(S_{23} - f_2 - f_3)} \quad (10)$$

and $$B = \frac{f_2[S_{23}^2 - (S_{23} - f_3)(l - t_2 - t_3)]}{S_{23} - f_2 - f_3} \quad (11)$$

and the lens spacings $S_{12}$, $S_{23}$ and $S_{34}$ may not take on negative values since this would amount to one lens passing through the other. It will be noted that $S_{12}$ is a continuous function of $S_{23}$ except at the point $$S_{23} = f_2 + f_3 \quad (12)$$

a situation which is not physically realizable when the second and third lenses are diverging lenses.

In the analysis of the FIG. 2 system, where identical inner lens are used it will be assumed that $$f_2 = f_3 = f \quad (13)$$
$$t_2 = t_3 = t \quad (14)$$
$$l_0 = l - t_2 - t_3 \quad (15)$$

With these substitutions into Equation 9 the inner lens positions are given by $$S_{12} = \tfrac{1}{2}(2q_1 + l_0 + S_{23}) \pm \left[\frac{(S_{23} - l_0 S_{23} + 2f l_0)(S_{23} - l_0 + 2f)}{4(S_{23} - 2f)}\right]^{1/2} \quad (16)$$

Figure 3:
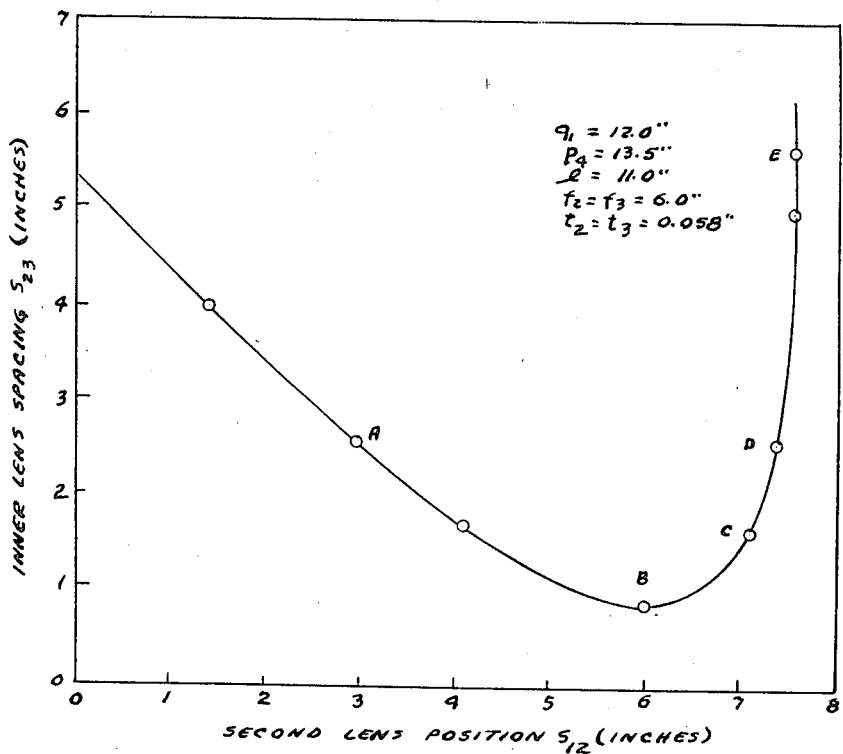
Figure 7:
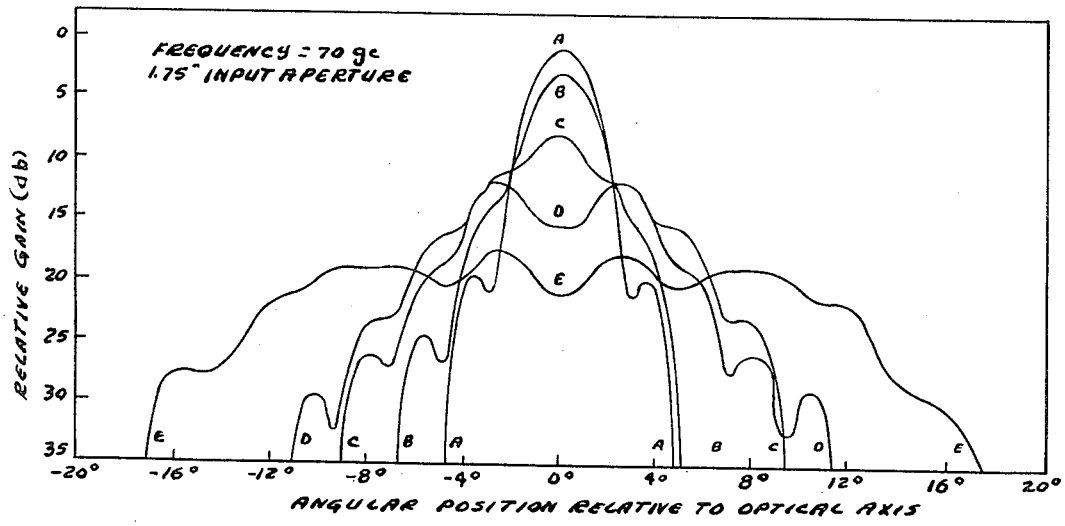
FIGS. 7 and 8 show variable beamwidth patterns at 70 gc. and 140 gc., respectively.

The inner lens positions, as calculated from Equation 16 for an experimental system are shown in FIG. 3. As can be seen in FIG. 3, for each adjustment of the position of one of the movable lenses complementary adjustment of the other movable lens is required to maintain system focusing.

With the spatial relationships of the lenses 14 and 16 established according to the data given in FIG. 3, the extent of lateral magnification of the zoom lens system can be determined. By lateral magnification is meant the ratio between the transverse dimension of the final image and the corresponding dimension of the original object. For an axial lens system with which this invention is concerned, the total lateral magnification is a function of the magnification of each of the lenses making up the system. Hence, for the zoom lens of FIG. 1 the lateral magnification, M, is $$M = (-q_1/p_1)(-q_2/p_2)(-q_3/p_3)(-q_4/p_4) \quad (17)$$

Figure 4:
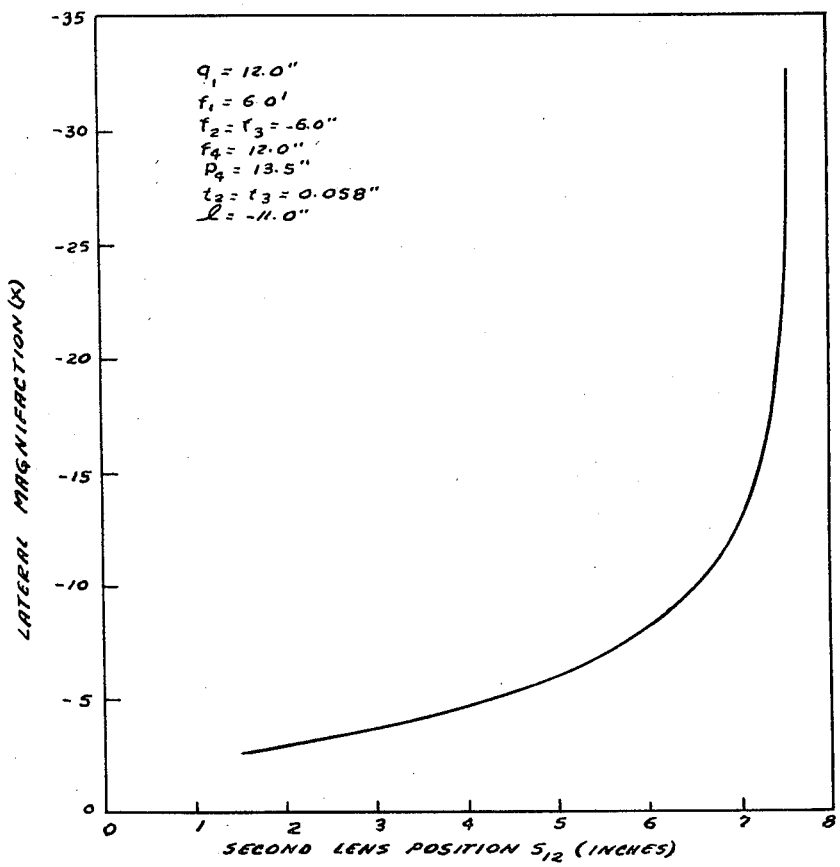
FIG. 4 illustrates typical lateral magnification of a zoom lens apparatus of the type shown in FIGS. 1 and 2.

In terms of the lens spacings $$M = \frac{q_1 q_4 f_2}{p_1 p_4 f_3}\left[\frac{S_{12} + S_{23} - l_0 + q_1 - f_3}{S_{12} - (q_1 + f_2)}\right] \quad (18)$$

where $S_{12}$ and $S_{23}$ are related by Equation 9. Thus, from Equation 18 it can be seen that the lateral magnification of a typical zoom lens system is a continuous function of the positions of the movable lenses if the possible pole at $S_{12} = q_1 + f_2$ is excluded from the allowed range of values of $S_{12}$. The curve shown in FIG. 4 gives a negative value for the lateral magnification which indicates that the image at the image plane is inverted. With respect to FIG. 4, complementary values of the spacing $S_{23}$ for each value of $S_{12}$ may be obtained from FIG. 3.

The description hereinabove has been directed essentially to a typical zoom lens system in terms of geometrical optics. This has required the assumption of both aberration-free lenses and a wavelength vanishingly small compared to the lens diameters. In the visible region of the spectrum, the assumption of ideal lenses free of aberration is often difficult to satisfy. Consequently, lens aberrations generally prove more troublesome than the effects of diffraction, and corrections to the geometrical theory can be obtained by the use of ray tracing or similar techniques. In the microwave and millimetric wave portion of the spectrum this situation is usually reversed. The ratios of the lens diameters to the wavelength is usually sufficiently large that the effects of diffraction determine the distortion caused by lens aberrations.

In evaluating the effects of diffraction in the visible part of the spectrum, it has been established that a sensible analysis includes a combination of geometrical optics and scalar diffraction theory. Thus, for example, although the resolution of an optical system such as the zoom lens is usually determined by the degree of lens aberrations, the resolution imposed by diffraction can also be determined. When the diameters of the lenses and other apertures are large with respect to the wavelength, the image of an axially-located point object is described by a diffraction pattern. The characteristics of the pattern depend on the magnification of the system and the limiting aperture. The limiting aperture of the optical system, as is well known, is the aperture which determines the cross-sectional shape of the beam passing through the system. For the case of a circular limiting aperture, the diffraction image of an axial point object is the Airy distribution, which corresponds to a Fraunhofer diffraction pattern of a uniformly illuminated circular aperture.

Figure 5:
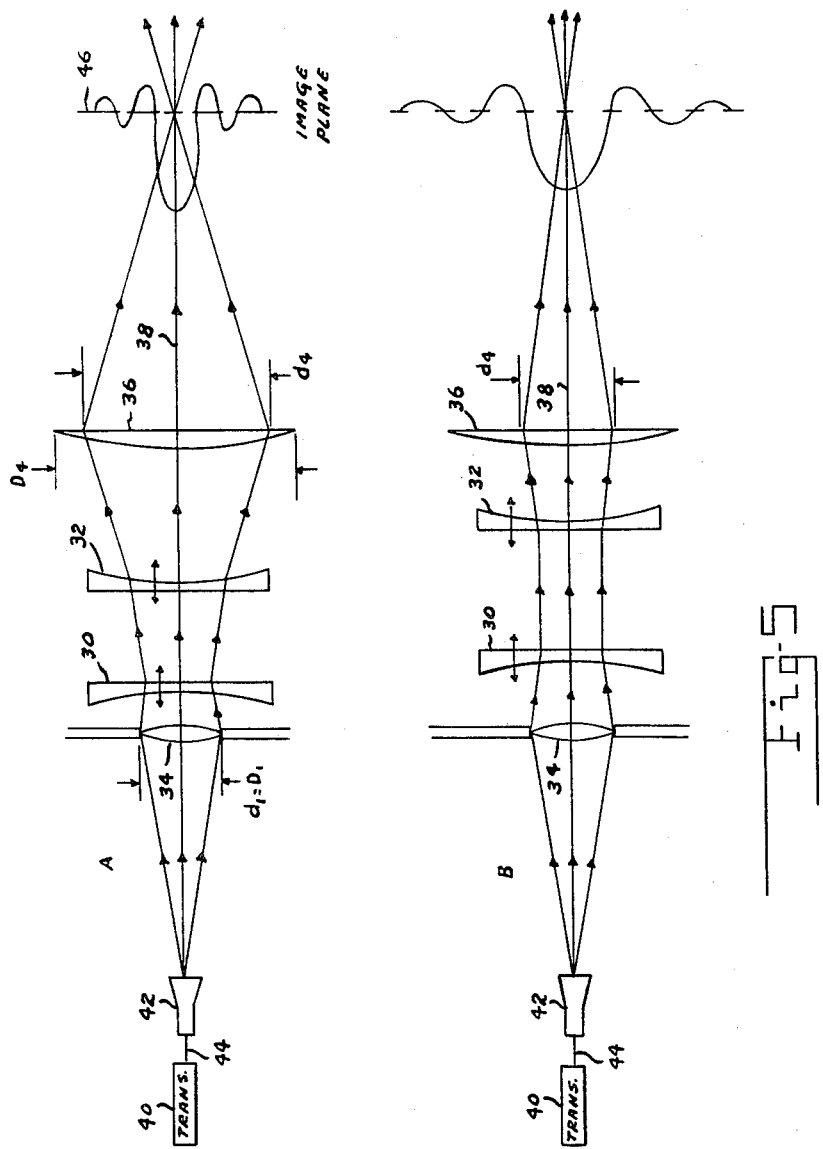
FIG. 5 shows a preferred embodiment of the variable beamwidth antenna of the invention.

The variable beamwidth antenna of the present invention is shown in FIG. 5, two conditions of adjustment A and B being presented. Two inner lenses 30 and 32 are movable between two fixed lenses 34 and 36, all four lenses being arranged on a common optical axis 38. In order to maintain a fixed focus, lenses 30 and 32 are mounted on beds (not shown) axially movable in opposite directions to allow primary motion by one of the inner lenses to be followed by complementary motion of the other inner lens. A transmitter 40 is shown energizing a small feed horn 42 by means of a coaxial transmission line 44 to propagate energy preferably in the microwave-frequency region along the axis 38. The electromagnetic energy feed thus produces a field approximating an axial point image of the first lens 34. In the operable relation shown, the image plane 46 at which the field pattern is observed is effectively at an infinite distance from the output lens 36. In addition, lens 34 is assumed to be of circular shape and thus, as the limiting aperture, imposes a cross-sectional shape on the beam passing through the lens system. Assuming ideal lenses with sufficiently large apertures the Fraunhofer pattern of the variable beam-width antenna will effectively lie at infinity and consist of the Airy disk.

With the relative displacement of the inner lenses 30 and 32 illustrated in FIG. 5, and in proper amounts and direction, the lateral magnification of the image field will vary and produce changes in the Airy distribution. The narrow main lobe pattern in FIG. 5A corresponds essentially to the low magnification case of FIG. 1A in the visible optics analysis. The wider main lobe configuration of FIG. 5B and the greater image magnification shown in FIG. 1B are related in the same fashion.

The properties of the Fraunhofer diffraction pattern of the variable beamwidth antenna of FIG. 5 will now be considered. According to assumptions made above in treating the zoom lens system, all of the microwave energy emitted from the mouth of horn 42 which is admitted by lens 34 will travel completely from one end of the optical lens system to the other. Thus, it follows that the beam between the end regions defined by the stationary lenses has a circular cross section in a plane normal to the axis 38. Let the diameter of the beam at output lens 36 be $d_4$ as shown. The Fraunhofer pattern of the variable beamwidth antenna can therefore be approximated by the pattern applicable to a uniformly illuminated circular aperture of diameter $d_4$. Turning to the similar triangle relations shown in FIG. 2, the beam diameter $d_2$ at lens 30 is given by $$d_2 = \left(\frac{p_2}{q_1}\right) D_1 \qquad (19)$$

where, in the invention embodiment of FIG. 5, $d_1 = D_1$ since the input lens 34 serves as the limiting aperture of the field represented in the image plane. At the output lens 36, the beam diameter $d_4$ is simply $$d_4 = \left(\frac{p_2 p_3 p_4}{q_1 q_2 q_3}\right) D_1 \qquad (20)$$

By resorting to Equations 3 to 8 inclusive Equation 20 can be rewritten as $$d_4 = \left(\frac{p_4 f_3}{q_1 f_2}\right)\left(\frac{S_{12} - q_1 - f_2}{S_{12} + S_{23} - l - q_1 + t_2 + t_3 + p_3}\right) D_1 \qquad (21)$$

The variation of beamwidth and power gain of the invention embodiment can now be estimated. For a beamwidth diameter $d_4$ for the system of FIG. 5 the half-power beamwidth, $\theta$, is given by:

$$\theta = \frac{1.02\lambda}{d_4} \text{ radians} \qquad (22)$$

and the power gain, G, is given by $$G = \left(\frac{\pi d_2}{\lambda}\right)^2 \qquad (23)$$

where $\lambda$ is the free space wavelength of the operating frequency.

For convenience, the gain and beamwidth of the variable beamwidth antenna of the invention will be normalized with respect to those of output lens 36. Taking the diameter of lens 36 to be $D_4$, the gain and bandwidth, respectively, that are obtained with uniform illumination of the lens 36 are $$G_4 = \left(\frac{\pi D_4}{\lambda}\right)^2 \qquad (24)$$

$$\theta_4 = \frac{1.02\lambda}{D_4} \text{ radians} \qquad (25)$$

The normalized gain and bandwidth become simply $$\frac{G}{G_4} = \left(\frac{d_4}{D_4}\right)^2$$

$$\frac{\theta}{\theta_4} = \frac{D_4}{d_4}$$

Figure 6:
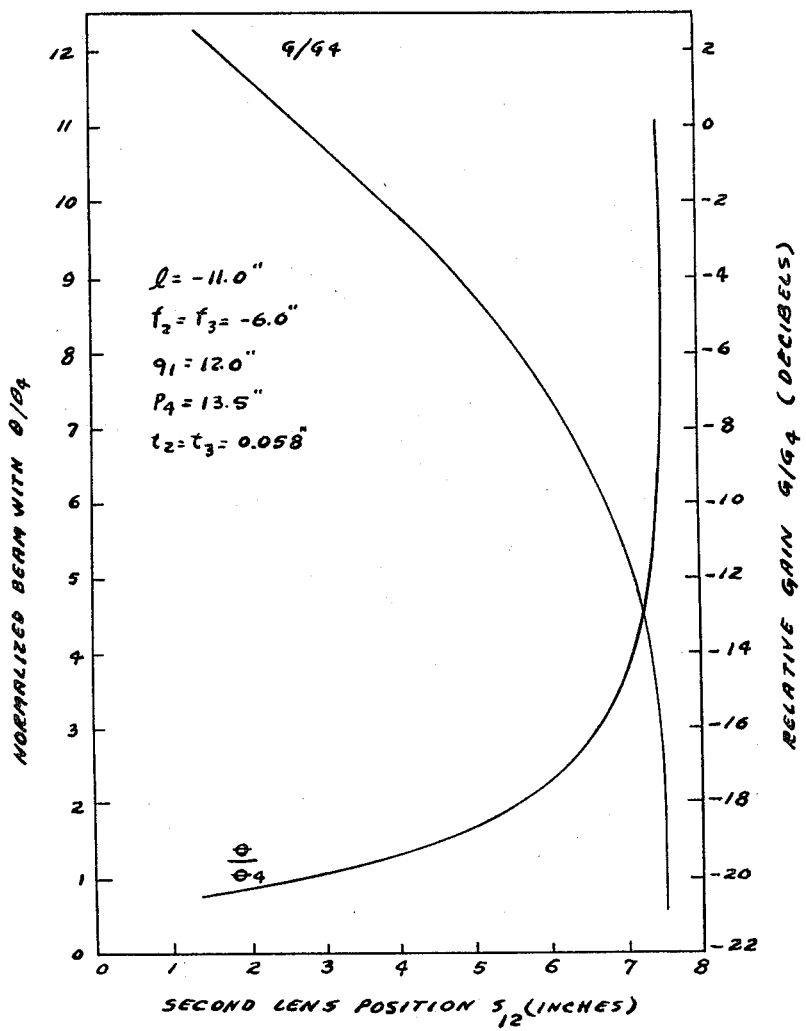
FIG. 6 is a graph of normalized gain and beamwidth of the invention embodiment of FIG. 5.

The resulting normalized gain and beamwidth variations for the variable beamwidth antenna of the invention are both plotted in FIG. 6 as a function of the second lens position $S_{12}$. Complementary distances $S_{23}$ are, as explained previously, available from FIG. 3. Limitations of the mounting apparatus during the experimental tests held the range of $S_{12}$ to values between about 1.37 inches to 7.54 inches. Over this range, the ratio of predicted values of the maximum and minimum bandwidth indicate a beamwidth variation of approximately 12.4. For the same range, the corresponding variation in relative gain is about 21.9 db.

For purposes of illustration, a distance $S_{12}$ of say 5 inches, taken from FIG. 6, requires a spacing of 1.0 inch for $S_{23}$ (FIG. 3). For these values, the relative gain in the image plane is approximately 7.0 db and the normalized beamwidth is approximately 2.3.

Experimental tests of the system of FIG. 5 were made at frequencies of 70 gc. and 140 gc. At 70 gc. a reflex klystron furnished the transmitter power. At the 140 gc. tests, the klystron drove a cross-guide harmonic generator adjusted for power production at the doubled frequency.

The feed horn used at 70 gc. was an open silver waveguide having an aperture 0.148 inch wide and 0.074 inch high. The phase center of this feed was determined to lie within 0.05 wavelength (or 0.008 inch) of the center of its radiating aperture. At 140 gc., a lower source of available transmitter power required a rectangular horn with an aperture 0.29 inch by 0.29 inch, and a flair angle of 14 degrees. The phase center was calculated to be 0.49 wavelength (or 0.041 inch) from its mouth. The amplitude distribution produced in the input lens aperture by this feed horn was constant to within ±0.45 db.

The details of the various lens elements of the variable beamwidth antenna of FIG. 5 and their dimensions are as follows:

TABLE 1

| Lens No. | Shape | Focal Length (Inches) | Diameter (Inches) | Axial Thickness (Inches) |
| --- | --- | --- | --- | --- |
| 1 | Symmetrical Biconvex | 6 | 1.75 | 0.155 |
| 2 | Plano-Concave | 6 | 4.5 | 0.155 |
| 3 | do | 6 | 4.5 | 0.155 |
| 4 | Plano-Convex | 12 | 4.5 | 0.587 |

Solid dielectric material for the lenses was deemed desirable, the lenses being fabricated from polystyrene, which, in the microwave region considered in the present invention, has a relative dielectric constant of 2.53±0.02 and a loss tangent of $(3 \pm 1) \times 10^{-3}$.

According to an operating embodiment of the invention, the lens components of the optical system were mounted in holders on a 54-inch long lathe bed that served as an optical bench. The holders of the outer lenses 34 and 36 were so mounted as to obtain the desired distance L between the principal planes of the input and output lenses. The waveguide 42 was located so that its phase center was the required 12 inches from the principal plane of the input lens. Lenses 30 and 32 were located on the bed between lenses 34 and 36 at positions specified in FIG. 3, several cardinal points A, B, C, D, and E being typical of a test run.

Figure 8:
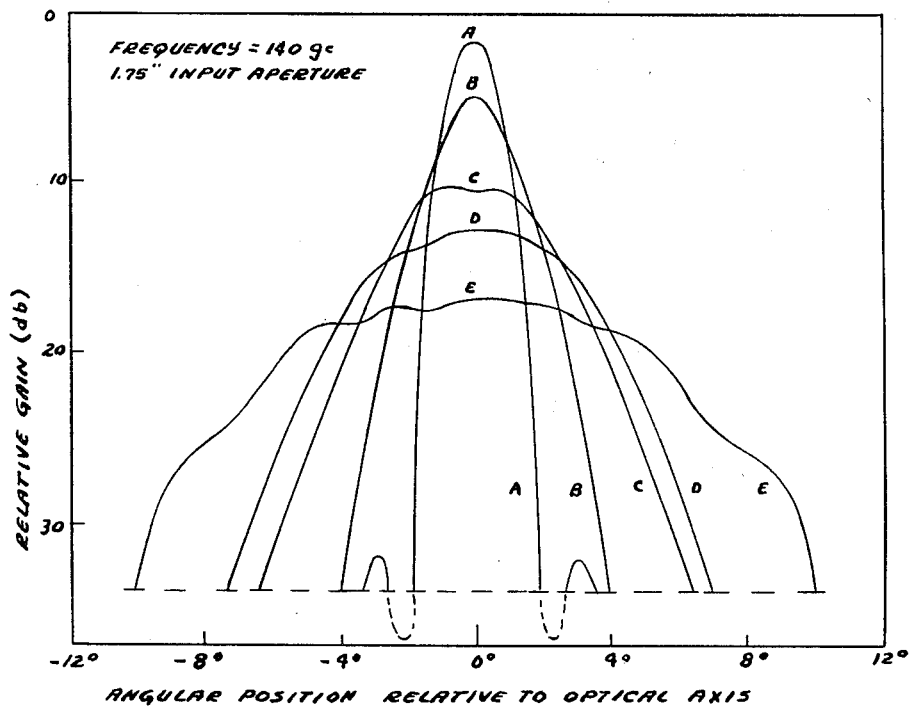

The H-plane radiation patterns that were obtained at 70 gc. at the various letter positions of FIG. 3 are shown in FIG. 1. There the flattening out of the field is due to the lateral magnificant. The H-plane Fraunhofer patterns that were obtained at 140 gc. are shown in FIG. 8, the maximum range of the inner lenses corresponding to the region between the points A and E in FIG. 3.

It will be appreciated that a major contribution of the invention to the microwave antenna art is to provide an accurate and reliable alternative to the presently used target acquisition and tracking procedure. Target scanning is normally accomplished by sweeping a narrow beamwidth wave over a certain limited space until target acquisition is registered. One important advantage of the present invention compared to this approach is to adjust the lateral magnification to obtain a beam of broad width during the acquisition mode, and then, in the tracking mode, to control the magnification to concentrate the energy into a much narrower beam, thus enabling greater precision in tracking.

Although only one embodiment of the invention has been illustrated and described, it will be apparent to those skilled in the art that various changes and modifications may be made therein without departing from the spirit of the invention or the scope of the appended claims.

I claim:

1. A microwave variable beamwidth antenna: comprising, a first and a second outer dielectric lens located on a common optical axis; said first and second lenses being positive lenses; an inner pair of negative dielectric lenses spaced from each other by a distance $S_{23}$ and having a focal length $f$ positioned between said first and second outer lenses with the first of said pair of inner lenses being spaced from said first outer lens by a distance $S_{12}$; a microwave radiation means positioned on said common optical axis for illuminating said first outer lens from an object plane at a distance $p_1$ from the first principal plane of the first outer lens whereby the object plane of said first outer lens will be positioned a distance $q_1$ from the second principal plane of the first outer lens; wherein the distance $S_{12}$ is related to the distance $S_{23}$ by the following expression, $$S_{12} = \tfrac{1}{2}(2q_1 + l_0 + S_{23}) \pm \left[ \frac{(S_{23} - l_0 S_{23} + 2fl_0)(S_{23} - l_0 + 2f)}{4(S_{23} - 2f)} \right]^{1/2}$$

where $$(l_0 = l - t_2 - t_3)$$

and $l$ is the distance between the image plane of the first outer lens and the object plane of the second outer lens and $t_2$ and $t_3$ are the spacing between the principal planes of the first and second inner lenses respectively.

2. A microwave variable beamwidth antenna as set forth in claim 1 in which all of said lenses are formed of polystyrene.

References Cited

UNITED STATES PATENTS 2,599,896  6/1952  Clark et al. _____ 343—754

ELI LIEBERMAN, *Primary Examiner.*